United States Patent [19]

Dearlove et al.

[11] Patent Number: 5,280,053
[45] Date of Patent: Jan. 18, 1994

[54] MACHINABLE, HIGH STRENGTH EPOXY TOOLING COMPOSITIONS

[75] Inventors: Thomas J. Dearlove, Shelby Township, Macomb County; Richard P. Atkins, Utica; Chen-Shih Wang, Troy, all of Mich.

[73] Assignee: General Motors Corporation, Detroit, Mich.

[21] Appl. No.: 26,913

[22] Filed: Mar. 5, 1993

Related U.S. Application Data

[63] Continuation-in-part of Ser. No. 880,382, May 8, 1992, abandoned.

[51] Int. Cl.$^5$ ............................ C08K 3/34; C08K 3/40; C08L 63/02
[52] U.S. Cl. ..................................... 523/435; 428/413; 428/417; 523/444; 523/458
[58] Field of Search ................... 523/435, 444, 458; 428/413, 417

[56] References Cited

U.S. PATENT DOCUMENTS

| | | | |
|---|---|---|---|
| 4,716,185 | 12/1987 | Rabener et al. | 523/456 |
| 4,891,394 | 1/1990 | Savin | 523/442 |
| 4,920,161 | 4/1990 | Wang et al. | 523/220 |
| 4,942,190 | 7/1990 | Murayama et al. | 523/400 |
| 5,098,780 | 3/1992 | Nemunaitis et al. | 523/428 |

FOREIGN PATENT DOCUMENTS 247420  9/1960  Australia .

*Primary Examiner*—Melvyn I. Marquis
*Assistant Examiner*—D. Aylward
*Attorney, Agent, or Firm*—George A. Grove

[57] ABSTRACT

A machinable, high strength epoxy tool which is the polymeric reaction product of a mixture containing 5 to 12 weight percent of a bisphenol A epoxy, 3 to 8 weight percent of at least one polyoxypropylene amine catalyst, 60 to 85 weight percent of a mixture of no less than three different sized particulate fillers, the major portion of which is iron powder, 5 to 15 weight percent of short (<250 μm) glass fibers, and 0.02 to 1 weight percent of a surface active agent.

5 Claims, No Drawings

MACHINABLE, HIGH STRENGTH EPOXY TOOLING COMPOSITIONS

FIELD OF THE INVENTION

This is a continuation-in-part application of our co-pending application Ser. No. 07/880,382, filed May 8, 1992 now abandoned.

The present invention generally relates to a machinable, high strength epoxy tooling composition for mass-cast and cast-to-size forming tools used in metal sheet stamping and, more particularly, it is concerned with a machinable, high strength epoxy tooling composition for making mass-cast and cast-to-size forming tools for metal sheet stamping which contains fillers, short glass fibers and a surface active agent.

BACKGROUND OF THE INVENTION

Forming dies for the repetitive stamping of large numbers of identical sheet metal parts are made of high strength tool steel because of its rigidity and durability. In the automotive industry, forming dies made of tool steel are used to stamp automobile body parts from steel sheets. However, such dies are expensive and require appreciable manufacturing time because large castings must be made and complex forming surfaces accurately machined.

It is a common practice in the automotive industry that before a new vehicle having a new body style is put in production, prototype vehicles are first built for testing. Designing forming tools with tool steel for stamping sheet metal parts used in these prototype vehicles would not be practical for several reasons. First, a prototype vehicle has to be built in a relatively short time which prohibits the use of tool steel for stamping dies due to the extensive machining required. Secondly, the design of a prototype vehicle is frequently changed many times from its original design before it reaches a final production model. This means that many stamping dies would have to be built before the design of a sheet metal part is finalized, thus making the building of stamping dies with tool steel prohibitive for cost reasons.

Prototype stamping tools have been made using a zinc alloy material called Kirksite. Even though a Kirksite tool is more economical to make than a steel die, a Kirksite tool still requires the use of a foundry as well as extensive machining to obtain the desired contour and close match between the tool halves. Furthermore, Kirksite tools are heavy and difficult to handle.

In recent years, there has been a renewed effort to develop mass-castable polymeric materials to make large and durable sheet metal forming tools. One family of these commonly used materials is epoxy resins.

It is well known in the art that it is extremely difficult to formulate a mass-castable, room temperature, fast curing epoxy that can be cast-to-size into high strength tools. By mass-castable, we mean the pouring of a liquid epoxy composition in one casting step to produce a completed portion of a tool. By cast-to-size, we mean a process in which the exact contour is obtained on the surface of a tool such that no machining, barbering or spotting on the tool surface is required.

For instance, U.S. Pat. No. 4,423,094 to Dearlove et al disclosed a tough, durable bisphenol A epoxy composition for use in making sheet metal stamping dies. While this material exhibits good mechanical strength, it does not form a durable punch for stamping tools. Moreover, it requires an extensive curing procedure, i.e., it must be hardened at room temperature overnight and then post-cured at 150° C. for two hours. Since most stamping tools for automobile body panels are large in size and weight, it is preferable to make dies that need no elevated temperature curing.

Others have used room temperature-curable epoxy resin systems such as those based on bisphenol A and an aromatic amine catalyst to make plastic tools. An extensive curing period of from four days to one week is required for this type of room temperature-curable epoxy composition. To achieve rapid cure, i.e., to cure in less than 24 hours, an aliphatic amine catalyst instead of an aromatic amine catalyst must be used in an epoxy molding composition. This type of rapid curing epoxy system has been used in adhesives and coatings where the maximum thickness of the epoxy layer is no more than 6.4 mm thick.

Attempts to use unfilled aliphatic amine catalyzed epoxy compositions in bulk casting epoxy tools met with little success. The major problems encountered in casting a bulk section epoxy tool with a rapid curing epoxy composition were severe shrinkage and dimensional distortion which led to unacceptable warpage of the tool. These problems were caused by the extreme heat generated by the exothermic curing process. Since the curing process proceeds very rapidly, the exothermic heat accumulated in a bulk section epoxy tooling could not be rapidly dissipated by heat transfer due to the low thermal conductivity of epoxy. This caused the formation of localized heat pockets and thermal shocks which led to shrinkage, cracking, and dimensional distortions.

When a material is selected for building stamping tools, both its compressive strength and its tensile strength are important considerations. To sustain a high compressive load in the vertical direction, a tooling material must have high compressive strength. Similarly, to sustain a high tensile load in the horizontal direction, a tooling material must also have high tensile strength. This type of tensile load, for example, is frequently seen in the cavity of a stamping tool having a V-shaped concave configuration in the tool surface. No commercially available mass-cast epoxy tooling materials have the necessary combination of compressive strength and tensile strength for making stamping tools.

U.S. Pat. No. 4,920,161 to Wang et al disclosed that within a specific range of formulations, 24-hour room temperature cured cast-to-size epoxy tooling materials with high tensile strength can be obtained. These formulations contained high loadings of specific particle sizes of inert fillers, in particular, silicon carbide and silica. The patent specifically taught rapidly-curable, distortion-free compositions that achieved high tensile strength as compared to commercial tooling materials.

It is desirable to use inert fillers other than silicon carbide or silica in epoxy tooling compositions. Tools cast with silicon carbide and/or silica fillers were found to be very difficult to subject to post processing such as minor machining, drilling, tapping, etc., for incorporating engineering changes. In addition, silicon carbide is moderately expensive and adds to the cost of the tooling material. However, substitution of other known suitable particulate fillers for the silicon carbide resulted in significant reductions in tensile strength.

It is, therefore, an object of the present invention to provide a mass-castable, highly filled epoxy tooling composition that has high tensile and compressive strength sufficient for making durable stamping tools that can be machined to make post-processing changes.

It is another object of the present invention to provide an epoxy tooling composition that can be rapidly cured at room temperature in less than 24 hours without significant dimensional distortion.

It is yet another object of the present invention to provide an epoxy tooling composition that can be rapidly cured at room temperature in less than 24 hours to make a cast-to-size metal sheet forming die by utilizing inert fillers other than silicon carbide.

It is a further object of the present invention to provide an epoxy tooling composition that can be rapidly cured into a dimensionally stable machinable sheet metal forming tool by utilizing a suitable combination of appropriately-sized iron fillers, short glass fiber reinforcements, and a surface active agent.

SUMMARY OF THE INVENTION

We provide a machinable, high strength, cast-to-size epoxy tooling composition that can be rapidly cured at room temperature in 12 hours and be used in casting a durable epoxy tool.

In accordance with a preferred embodiment of our invention, we utilize a highly-filled aliphatic amine/bisphenol A epoxy system. A diglycidyl ether of suitable viscosity is used preferably with at least one polyoxypropylene amine reactant. This epoxy resin-curing agent system constitutes about 8 to 20 percent by weight of the moldable mixture.

We use a particulate filler mixture comprising interstitially mixable particles of at least three different average sizes or size ranges. Iron powder of at least two different average sizes (e.g., 300 μm and 30 μm) constitutes 80 percent or more of the total particulate filler by weight. Any suitable other filler material (of complementary third particle size, e.g. about 3 μm) such as calcium carbonate is employed to accomplish the desired filler loading. Our particulate filler mixture constitutes about 60 to 85 percent by weight of the total moldable mixture. The total mixture serves, in part, as a heat sink to absorb and conduct away the heat of reaction of the resin-forming constituents. The fillers are not reactive with each other or the epoxy resin-curing agent system. The iron powder assures that the cured tool is machinable.

In addition to the particulate filler, we use short glass fibers (average length less than 250 micrometers). Surprisingly, such fibers are found to not unduly increase the viscosity of the castable mixture. The fibers do not increase the strength of the tool. The fibers make up 5 to 15 percent by weight of the moldable composition.

We have discovered unexpectedly that it is beneficial to use a combination of short glass fibers and certain additives that we call surface active agents in conjunction with iron fillers to produce machinable epoxy tooling formulations that exhibit excellent tensile strength. By surface active agents, we mean those materials that, together with the glass fibers, iron powders and/or other constituents, are found to markedly increase the tensile strength of the cured stamping tool. We set a target tensile strength at 58 to 60 MPa as a requirement for our stamping tools. At the same time, in order to retain other desirable properties such as low shrinkage and pourability, the formulations require the use of high filler loadings of interstitially-mixed particle sizes. We have discovered a group of surface active materials that are required when added in small quantities to increase tool strength without affecting its machinability.

Suitable additives are solid polymeric materials dissolved in a liquid vehicle. Such additives include polybutadiene/di-n-butyl adipate, poly(vinyl isobutyl ether) or poly(methyl n-octyl siloxane)/poly(propylene glycol). These additives as solutions are used in small amounts usually less than one percent by weight of the total tool composition.

Other objects, features and advantages of the present invention will become apparent upon consideration of the specification that follows.

DESCRIPTION OF PREFERRED EMBODIMENTS

The concept of using an interstitially-matched filler system in which the smaller particulate fillers fit in the interstitial spacings left by the larger and median size particle fillers was first proven and disclosed in our previous patent U.S. Pat. No. 4,920,161 assigned to the same assignee. While the compositions disclosed lacked machinability, our experience indicated that at a viscosity level of less than $150 \times 10^3$ centipoise, the filled epoxy composition was freely pourable and could be used in a cast-to-size tool making operation.

The epoxy resin used in our invention is a diglycidyl ether of bisphenol A supplied by Rhone-Poulenc, Inc., under the trade name of Epi-Rez 509. This epoxy resin has an approximate epoxy equivalent weight of about 180 to 196 and a viscosity at 25° C. in the range of 7500 to 9500 centipoise. Other commercial products that are substantially equal to this epoxy compound are Dow Chemical DER 330 resin, Ciba-Geigy Araldite 6005, and Shell Epon 826.

To achieve the fast curing reaction of our epoxy casting formulation, a blend of two aliphatic amines, polyoxypropylene triamine and polyoxyalkyleneamine, is used as the curing agent. The aliphatic amines are supplied by the Texaco Chemical Company under the trade name of Jeffamine T-403 and Jeffamine D-400. Jeffamine T-403 is a trifunctional primary amine having an average molecular weight of approximately 440. Its amine groups are located on the secondary carbon atoms at the ends of aliphatic polyether chains. Jeffamine D-400 is a difunctional primary amine having an average molecular weight of approximately 400.

Table I shows the effect of various particulate fillers on the tensile strength, tensile modulus and percent elongation of aliphatic amine/bisphenol A resin tooling formulations.

TABLE I

| Effect of Various Particulate Fillers (WT %) | | | | | | | |
|---|---|---|---|---|---|---|---|
| | I | II | III | IV | V | VI | VII |
| Epoxy Resin 509 | 18.6 | 68.3 | 16.7 | 17.3 | 10.2 | 20.2 | 10.2 |
| Jeffamine T-403 | 6.1 | 22.2 | 6.1 | 5.7 | 3.3 | 6.6 | 3.3 |
| Jeffamine D-400 | 2.6 | 9.5 | 2.7 | 2.4 | 1.4 | 2.8 | 1.4 |
| Silica-21 | 13.0 | | 13.3 | 13.3 | 9.7 | 14.0 | 9.7 |
| Silicon Carbide-100 | 43.2 | | | | | | |
| Silicon Carbide-400 | 16.5 | | | | | | |
| Silica-85 | | | 44.4 | | | | |
| Silica-23 | | | 16.8 | | | | |
| Al₂O₃-80 | | | | 44.4 | | | |
| Al₂O₃-400 | | | | 16.9 | | | |
| Iron ATW-432 | | | | | 55.7 | | |
| Iron ATW-230 | | | | | 19.7 | | |
| Aluminum 120 | | | | | | 47.0 | |
| Aluminum 1401 | | | | | | 9.4 | |
| Zinc 1206 | | | | | | | 55.7 |
| Zinc 1222 | | | | | | | 19.7 |
| Tensile Strength | 59.5 | 64.0 | 49.1 | 54.1 | 48.8 | 49.5 | 46.6 |

TABLE I-continued

| Effect of Various Particulate Fillers (WT %) | | | | | | | |
|---|---|---|---|---|---|---|---|
| | I | II | III | IV | V | VI | VII |
| (MPa) | | | | | | | |
| Tensile Modulus (GPa) | 12.4 | 3.2 | 12.8 | 15.3 | 12.3 | 10.8 | 10.7 |
| Elongation (%) | 0.5 | 4.5 | 0.9 | 0.4 | 0.3 | 0.7 | 0.6 |

In Table I, compound I is a formulation that was disclosed in U.S. Pat. No. 4,920,161. In this compound, silica-21 has a particle size distribution of 51% smaller than 5 microns, 90% smaller than 15 microns and an average particle size of 2 microns. It is supplied by Whittaker, Clark & Daniels, Inc. Silicon carbide-100 has particle sizes in the range between 63 and 203 microns with an average particle size of 122 microns. Silicon carbide-400 has particle sizes in the range between 11 and 45 microns with an average particle size of 22 microns. Both are commercially available from Electro Abrasives Corporation.

Compound I has good strength, but the high silicon carbide content causes difficulty in machining.

Compound II is a pure epoxy material which has a high tensile strength and a very low tensile modulus value.

Compound III, instead of silicon carbide particles, has a total of three different silica particulate fillers in which silica-85 is an 85 mesh washed silica sand supplied by the Weldron Silica Company. Silica-23 is another silica commercially available from Whittaker, Clark & Daniels, Inc. It has a particle size distribution of 80% smaller than 200 mesh, 70% smaller than 325 mesh. It is seen that compound III, which eliminates silicon carbide, has a reduced tensile strength value of only 49.1 MPa. This illustrates the need for the selection of suitable filler combinations to complement the rapid curing epoxy precursors.

Compound IV has one silica filler and two aluminum oxide fillers supplied by Electro Mineral Corporation. Al$_2$O$_3$-80 is 80 mesh aluminum oxide powder and Al$_2$O$_3$-400 is 400 mesh aluminum oxide powder. Aluminum oxide fillers contribute to the strength of the filled epoxy composition, but the abrasiveness of this filler will also cause difficulty in machining.

In compound V, two iron filler powders, ATW-432 and ATW-230 supplied by Hoeganaes, are used in place of the aluminum oxide. These iron fillers contain 98 to 99 percent iron. The sieve analysis of ATW-432 indicated 2% greater than 425 microns, 61% between 180 and 425 microns, 32% between 75 and 180 microns and 5% between 44 and 75 microns. For purposes of characterizing the mean size of ATW-432 in formulating our compositions, we note that the bulk of the iron powder lies between 180 microns and 425 microns. We treat it as having a mean size of about 300 μm. The sieve analysis of ATW-230 indicated 4.7% between 62 and 88 microns, 17.6% between 44 and 62 microns, 28.8% between 31 and 44 microns, 26.9% between 22 and 31 microns, 15.1% between 16 and 22 microns, 5.5% between 11 and 16 microns, and 2.4% at less than 11 microns. For purposes of characterizing the mean size of ATW-230 in formulating our compositions, we note that the preponderance of the powder lies between 22 and 44 microns. We treat it as having a mean size of about 33 μm. It is seen in compound V that epoxy composition with iron fillers alone does not meet our tensile strength value target of 58 to 60 MPa.

Compound VI contains aluminum powder of aluminum 120 and aluminum 1401 supplied by Alcoa. Aluminum 120 has an average particle size between 25 to 30 microns with 25% to 50% smaller than 44 microns and containing 99.7% aluminum 1401 has an average particle size between 6 to 9 microns with 98% smaller than 44 microns and containing 99.7% aluminum. Aluminum powder-filled epoxy compositions do not meet our target for tensile strength values. Compound VII is an epoxy formulation containing zinc fillers of zinc 1206 and zinc 1222 supplied by Zinc Corporation of America. Zinc 1206 is 99% zinc with 45% smaller than 150 microns. Zinc 1222 is 99% zinc with 30% to 70% smaller than 44 microns. It is also seen that zinc fillers do not provide a tensile strength value of 58 to 60 MPa to the epoxy composition.

Table II shows the unexpected result of using an additive commercially known as an epoxy resin fortifier and a short glass fiber to improve tensile strength of certain of our epoxy compositions. We have now settled on the use of a high proportion of iron filler because of its contribution of strength and machinability.

TABLE II

| Use of Fortifiers and Glass Fibers to Improve Tensile Strength (WT %) | | | | | | |
|---|---|---|---|---|---|---|
| | II | VIII | V | IX | X | XI |
| Epoxy Resin 509 | 68.3 | 59.7 | 10.2 | 8.9 | 10.0 | 8.8 |
| Jeffamine T-403 | 22.2 | 21.9 | 3.3 | 3.3 | 3.3 | 3.2 |
| Jeffamine D-400 | 9.5 | 9.6 | 1.4 | 1.4 | 1.4 | 1.4 |
| Silica 21 | | | 9.7 | | | |
| CaCO$_3$ | | | | 9.7 | 9.5 | 9.6 |
| EF-20 | | 8.9 | | 1.3 | | 1.3 |
| Iron ATW-432 | | | 55.7 | 55.7 | 54.8 | 54.8 |
| Iron ATW-230 | | | 19.7 | 19.7 | 9.3 | 9.3 |
| Glass Fibers 737BC | | | | | 11.7 | 11.6 |
| Tensile Strength (MPa) | 64.0 | 68.1 | 48.8 | 53.5 | 49.5 | 60.2 |
| Tensile Modulus (GPa) | 3.2 | 2.9 | 12.3 | 13.5 | 11.9 | 11.8 |
| Elongation (%) | 4.5 | 3.6 | 0.3 | 0.5 | 0.3 | 0.4 |

Compounds II and VIII are both compositions which do not contain any fillers. The addition of the fortifier EF-20 to compound II led to compound VIII and shows that an improvement in tensile strength from 64 to 68.1 MPa was obtained. EF-20 is a non-elastomeric modifier for cured epoxy resins supplied by the Polysar Corporation. It is a liquid mixture of approximately molecularly equivalent portions of 3,4-epoxy cyclohexylmethyl-3',4'-epoxy cyclohexane carboxylate and a p-aminotoluene adduct of such epoxylated cycloaliphatic material. It has a viscosity at 60° C. between 200 to 1500 centipoise and a specific gravity of 1.20 and an epoxy equivalent weight of 131 to 143. Compound IX containing iron fillers and fortifier EF-20 and compound X containing iron fillers and glass fibers both gave low tensile strengths of 53.5 and 49.5 MPa, respectively. In compound X, short glass fibers were used to avoid drastic increases in viscosity that we experienced with longer fibers. Thus, we maintained the pourability of the material. The combined effect of a fortifier EF-20 and glass fibers when used in conjunction with iron fillers is shown in compound XI. A synergistic effect between the fortifier, the glass fibers and the iron fillers resulted in a significantly higher tensile strength of 60.2 MPa.

The calcium carbonate used in Table II was supplied by Whittaker, Clark & Daniels, Inc. under the trade name of Clarcal 9125. It contains 97% to 99% CaCO$_3$ and trace amount of MgCO$_3$, Al$_2$O$_3$ and SiO$_2$. It has a specific gravity of 2.71 and a mean particle size of 3.2 microns. The glass fibers 737BC is commercially available from Owens Corning. It is a silane-treated milled glass with an average length of 53 microns and an average diameter of 16 microns. We believe glass fibers having a length up to 250 microns may suitably be used.

The respective constituents of each compound were incorporated and mixed so as to uniformly distribute all ingredients. The mixing was done in vacuum so as to remove air from the liquid-solids mixture and avoid bubble formation in the cast part. In these examples, the formulation was cast into tensile test specimens which were cured at room temperature for 12 hours.

Since EF-20 is not reactive in our epoxy system, we suspected that it might be functioning as a surface active agent. Therefore, we investigated another fortifier and several other known wetting and dispersing (surface active) agents. The results are shown in Table III.

TABLE III

| Effect of Surface Active Agents (WT %) | | | | | | | | |
|---|---|---|---|---|---|---|---|---|
| | X | XI | XII | XIII | XIV | XV | XVI | XVII |
| Epoxy Resin 509 | 10.0 | 8.8 | 8.8 | 10.0 | 10.0 | 10.0 | 10.0 | 10.0 |
| Jeffamine T-403 | 3.3 | 3.2 | 3.2 | 3.3 | 3.3 | 3.3 | 3.3 | 3.3 |
| Jeffamine D-400 | 1.4 | 1.4 | 1.4 | 1.4 | 1.4 | 1.4 | 1.4 | 1.4 |
| $CaCO_3$ | 9.5 | 9.6 | 9.6 | 9.6 | 9.6 | 9.6 | 9.6 | 9.6 |
| Iron ATW-432 | 54.8 | 54.8 | 54.8 | 54.7 | 54.7 | 54.7 | 54.7 | 54.7 |
| Iron ATW-230 | 9.3 | 9.3 | 9.3 | 9.3 | 9.3 | 9.3 | 9.3 | 9.3 |
| Glass Fibers 737BC | 11.7 | 11.6 | 11.6 | 11.6 | 11.6 | 11.6 | 11.6 | 11.6 |
| EF-20 | | 1.3 | | | | | | |
| EF-15 | | | 1.3 | | | | | |
| BYK-052 | | | | 0.1 | | | | |
| BYK-W980 | | | | | 0.1 | | | |
| BYK-W935 | | | | | | 0.1 | | |
| BYK-A525 | | | | | | | 0.1 | |
| BYK-A500 | | | | | | | | 0.1 |
| Tensile Strength (MPa) | 49.5 | 60.2 | 63.2 | 58.1 | 53.4 | 51.2 | 56.1 | 59.6 |
| Tensile Modulus (GPa) | 11.9 | 11.8 | 12.8 | 10.0 | 15.7 | 15.9 | 15.9 | 16.3 |
| Elongation (%) | 0.3 | 0.4 | 0.6 | 0.6 | 0.4 | 0.4 | 0.4 | 0.4 |

In Table III, EF-15 is another fortifier supplied by the Polysar Corporation. It is a non-elastomeric modifier for improving the physical properties and performance of amine-cured epoxy composites and consists of 50 weight percent of an aromatic ether ester amide (approximately 430 MW), 25 weight percent mono amide of glutaric acid and 25 weight percent of diphenyl ether of glycerine. It has a viscosity at 60° C. approximately 1000 centipoise and a specific gravity of 1.16.

The BYK additives were a series of wetting and dispersing agents made by the BYK Chemie Company. It appears that these additives enable better bonding between resin, glass and fillers. We found that certain of them produced higher physical properties in our epoxy tool compositions.

BYK-052 is a solution of poly(vinyl isobutyl ether) in Stoddard solvent and 2-butoxy ethanol (about 28 percent solids by weight). Stoddard solvent is a petroleum distillate per ASTM D-484-52. BYK-W980 is a solution of a salt of unsaturated polyamine amides and higher molecular weight acidic esters in xylene and 2-butoxy ethanol (about 75% solids by weight). BYK-W935 is a solution of a higher molecular weight unsaturated polycarboxylic acid in xylene and 2,6 dimethyl-4 heptanone (about 50% solids by weight). BYK-A525 is a solution of poly(methyl-n-octyl siloxane) (72 weight percent) and poly(propylene glycol) (28 weight percent) in Stoddard solvent and 1-methoxy-2-propanol acetate. BYK-A500 is a solution of polybutadiene (64 weight percent) and di-n-butyl adipate (36 weight percent) in an aromatic/aliphatic petroleum naphtha.

Although these BYK surface active materials were added as solutions to their respective formulations, the mixing was done in vacuum, and it is believed that the solvent portions were evaporated. The principal contribution of the additives was from their solid residue.

In close examination of data contained in Table III, compound X, which contains iron fillers and glass fibers but no surface active agent, has a tensile strength of only 49.5 MPa and a low tensile modulus of 11.9 GPa. Compound XI and compound XII containing surface active agents of EF-20 and EF-15, respectively, produce a much higher tensile strength of 60.2 MPa and 63.2 MPa, respectively. However, the tensile modulii of these two compounds are approximately the same as that of compound X. Compound XIII through compound XVII all contain surface active agents produced by BYK Chemie Company. It is seen that they all have improved tensile strength when compared to compound X. Specifically, compound XVII which contains BYK-A500 surface active agent has the best combination of properties, i.e., a tensile strength of 59.6 MPa and a tensile modulus of 16.3 GPa. Therefore, BYK-A500 surface active agent appears to be the most effective additive for our epoxy composition containing iron fillers and glass fibers. We also view BYK-052 and BYK-A525 as suitable additives for use in our compositions.

To further investigate the effect of using BKY-A500 surface active agent, we have conducted another series of experiments by adding different quantities of BYK-A500 as the surface active agent. These data are contained in Table IV. A full range of concentration of BYK-A500 was investigated in the range between 0.03 and 0.17 weight percent of the total epoxy composition. It appears that compounds XVIII, XIX, XX and XVII containing between 0.03 and 0.14 weight percent of the surface active agent BYK-A500 all have greatly improved tensile strength and tensile modulus values.

TABLE IV

| Effect of Concentration of BYK-A500 (WT %) | | | | | | |
|---|---|---|---|---|---|---|
| | X | XVIII | XIX | XX | XVII | XXI |
| Compound X | 100 | 99.97 | 99.93 | 99.90 | 99.86 | 99.83 |
| BYK-A500 | 0 | 0.03 | 0.07 | 0.10 | 0.14 | 0.17 |
| Tensile Strength (MPa) | 49.5 | 60.3 | 63.4 | 60.6 | 59.6 | 53.2 |
| Tensile Modulus (GPa) | 11.9 | 15.9 | 14.2 | 12.8 | 16.3 | 11.3 |
| Elongation % | 0.3 | 0.4 | 0.5 | 0.5 | 0.4 | 0.5 |

In general, we found that the epoxy fortifiers EF-15 and -20 are not preferred for use in our formulations because of their expense and their high viscosity, which made it difficult to suitably incorporate them into large volume formulations for the making of epoxy tools.

Thus, our epoxy tool compositions contain, by weight, about 8 to 20 percent epoxy resin-curing agent system that consists essentially of 5 to 12 percent of a diglycidyl ether of bisphenol A and 3 to 8 percent of an aliphatic di- or tri-amine curing agent. Preferably, the bisphenol A has an epoxy equivalent weight in the range of 180 to 196 and/or a viscosity at 25° C. in the range of 7500 to 9500 centipoise. For suitably rapid curing of our resin and for as-cured properties, we prefer the use of polyoxyalkyline di- and/or tri-amines. A mixture of polyoxypropylene di- and tri-amines each having molecular weights of 400 to 440 is especially preferred.

Our epoxy compositions are highly filled—using 60 to 85 percent of three distinct size groupings of particulate fillers, mostly iron powder, 5 to 15 percent short glass fibers up to about 250 μm in length, and a small amount, suitable up to one percent and preferably 0.02 to 0.2 percent, of a suitable "surface active" agent that enhances the contributions of all the ingredients to form a surprisingly strong stamping tool.

An air bubble-free uniform mixture of epoxy resin precursors, particulate filler, glass fibers and surface active agent is completed just prior to casting of the tool. Of course, an accurate pattern of the tool has been prepared and located in a suitable container for the fluid mixtures. The castable mixture is carefully poured into such mold so as to avoid entrainment of air or other contamination. The cast mixture is then allowed to stand at room temperature.

Typically within about 12 hours, the epoxy resin-curing agent system has reacted to form a strong resinous matrix entraining iron powder, other powder interstitially mixed with the iron, and short glass fibers. The combination of iron, short glass fibers and surface active material contributes to the castability of the mixture and the strength, durability and machinability of the substantially cast-to-size tool.

While our invention has been described in terms of certain specific examples, it is apparent that suitable variations could be made in view of our specification. Accordingly, we intend to be limited only by the scope of the following claims.

The embodiments of the invention in which an exclusive property or privilege is claimed are defined as follows:

1. A cast, high strength, machinable epoxy tool which is the polymeric reaction product of a filled epoxy resin-curing agent mixture consisting essentially of, on a weight percentage basis of the total said mixture,
   8 to 20 percent of epoxy resin-curing agent system consisting essentially of a liquid diglycidyl ether of bisphenol A and at least one liquid di-or tri-amine functional polyoxyalkylene amine reactive with said bisphenol A as a curing agent,
   60 to 85 percent particulate filler, a major portion of which is iron powder, said filler being characterized by the presence of at least three distinct size groupings of which each successively smaller group is about one-quarter or less the mean size of the next larger group,
   5 to 15 percent glass fibers up to 250 micrometers in length, and
   0.02 to 1.0 percent of an agent consisting essentially of a polymeric material selected from the group consisting of butadiene polymer, poly(vinyl isobutyl ether) and alkyl siloxane polymers.

2. A cast, high strength, machinable epoxy tool which is the polymeric reaction product of a filled epoxy resin-curing agent mixture consisting essentially of, on a weight percentage basis of the total said mixture,
   8 to 20 percent of epoxy resin precursors consisting essentially of a liquid diglycidyl ether of bisphenol A and at least one liquid di- or tri-amine functional polyoxyalkylene amine reactive with said bisphenol A as a curing agent,
   60 to 85 percent particulate filler sized for interstitial mixing, at least 80 percent of which is iron powder, said filler being characterized by the presence of at least three distinct size groupings of which each successively smaller group is about one-quarter or less the mean size of the next larger group,
   5 to 15 percent glass fibers up to 250 micrometers in length, and
   0.02 to 1.0 percent of an agent consisting essentially of a polymeric material selected from the group consisting of butadiene polymer, poly(vinyl isobutyl ether) and alkyl siloxane polymers.

3. A cast epoxy tool as recited in claim 2 where said polymeric material is butadiene polymer.

4. A cast epoxy tool as recited in claim 2 where said polymeric material is poly(vinyl isobutyl ether).

5. A cast epoxy tool as recited in claim 2 where said polymeric material is an alkyl siloxane polymer.

* * * * *